(12) United States Patent
Heinecke et al.

(10) Patent No.: US 9,823,651 B2
(45) Date of Patent: Nov. 21, 2017

(54) RE-SEQUENCING OF CLIENT ORDERS UNDER CONTROLLED JUST-IN-SEQUENCE DELIVERIES FOR AVOIDING PRODUCTION DOWNTIME AND/OR PRODUCTION REWORK DUE TO MISSING AND/OR DEFECT PARTS

(71) Applicant: SIEMENS AKTIENGESELLSCHAFT, Munich (DE)

(72) Inventors: Georg Heinecke, Flechtingen (DE); Steffen Lamparter, Feldkirchen (DE); Raffaello Lepratti, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 246 days.

(21) Appl. No.: 14/430,612

(22) PCT Filed: Jul. 11, 2013

(86) PCT No.: PCT/EP2013/064681
§ 371 (c)(1),
(2) Date: Mar. 24, 2015

(87) PCT Pub. No.: WO2014/044427
PCT Pub. Date: Mar. 27, 2014

(65) Prior Publication Data
US 2015/0253767 A1    Sep. 10, 2015

(30) Foreign Application Priority Data

Sep. 24, 2012  (DE) .......................... 10 2012 217 196
Jan. 30, 2013  (EP) ...................................... 13000441

(51) Int. Cl.
*G06F 19/00*    (2011.01)
*G05B 19/418*   (2006.01)
*G06Q 10/06*    (2012.01)

(52) U.S. Cl.
CPC ... *G05B 19/41865* (2013.01); *G06Q 10/0631* (2013.01); *G05B 2219/31395* (2013.01)

(58) Field of Classification Search
CPC .............. G06Q 10/06; G06Q 10/0631; G06Q 10/06311; G06Q 10/06315;
(Continued)

(56) References Cited

U.S. PATENT DOCUMENTS 6,094,603 A *  7/2000  Ishii ....................... G06Q 10/06
                                                         700/106
7,197,469 B2 *  3/2007  Hegde .................... G06Q 10/06
                                                         705/7.22

(Continued)

OTHER PUBLICATIONS

Lamparter et al., Event-based Reactive Production Order Scheduling for Manufacturing Execution Systems, 18th IFAC World Congress, Aug. 2011.*

(Continued)

*Primary Examiner* — Darrin Dunn
(74) *Attorney, Agent, or Firm* — Laurence Greenberg; Werner Stemer; Ralph Locher

(57) ABSTRACT

A method and a system for re-sequencing client production orders where client-individualized JIS components have not been delivered in due time according to the planned production schedule due to disturbances or have been delivered, but are defective. Three major steps are performed. First, by the introduction of the concept of differently permutable sub-sequences, the frozen time zone is divided into a plurality of sub-sequences of different length in time wherein the length is adapted to the time variants in the re-planning process. Second, using a knowledge-based model, the con- (Continued)

sequences of a disturbance are classified to be caused either by delayed supply or by defective parts. Third, after determining the type of distortion combining the type of subsequence with the status of the supply leads to the generation of three possible algorithms for the re-sequencing of the client production order.

6 Claims, 6 Drawing Sheets

(58) Field of Classification Search
CPC ..... G06Q 10/063114; G06Q 10/06316; G06Q 10/0639; G06Q 10/0835; G05B 19/41865; G05B 2219/32271; G05B 2219/34379; G05B 2219/32265; G05B 2219/45197; Y02P 90/20; B01L 2200/12
See application file for complete search history.

(56) References Cited

U.S. PATENT DOCUMENTS

| | | | | |
|---|---|---|---|---|
| 7,533,043 B2* | 5/2009 | Carney | ............ | G06Q 10/06 700/106 |
| 8,423,429 B2* | 4/2013 | Aiso | ............ | G06Q 10/06 705/22 |
| 9,285,798 B2* | 3/2016 | Lamparter | ............ | G05B 19/418 |
| 2001/0014836 A1* | 8/2001 | Tamaki | ............ | G06Q 10/06 700/99 |
| 2003/0109950 A1* | 6/2003 | Andrade, Jr. | ............ | G06Q 10/06 700/103 |
| 2004/0128213 A1* | 7/2004 | Wei | ............ | G06Q 10/087 705/28 |
| 2004/0148206 A1* | 7/2004 | Matsumoto | ............ | G06Q 10/025 705/6 |
| 2006/0259174 A1* | 11/2006 | Daferner | ............ | G05B 19/41865 700/100 |
| 2007/0129978 A1* | 6/2007 | Shirasu | ............ | G06Q 10/06 705/7.11 |
| 2008/0275796 A1* | 11/2008 | Katircioglu | ............ | G06Q 10/06 705/28 |
| 2011/0046769 A1* | 2/2011 | Nakano | ............ | G05B 19/41865 700/106 |
| 2012/0095581 A1* | 4/2012 | Wood | ............ | G06Q 10/06 700/100 |
| 2012/0245972 A1* | 9/2012 | Sorgie | ............ | G06Q 30/06 705/7.28 |
| 2013/0117061 A1* | 5/2013 | Ben-Hamida | ............ | G06Q 10/08 705/7.22 |
| 2013/0166055 A1* | 6/2013 | Ishibashi | ............ | G06F 17/00 700/100 |
| 2014/0018951 A1* | 1/2014 | Linton | ............ | G06N 5/02 700/105 |

OTHER PUBLICATIONS

Emmanouilidis et al., Advances in Production Management Systems, IFIP WG 5.7 Int. Conf., APMS 2012.*

* cited by examiner

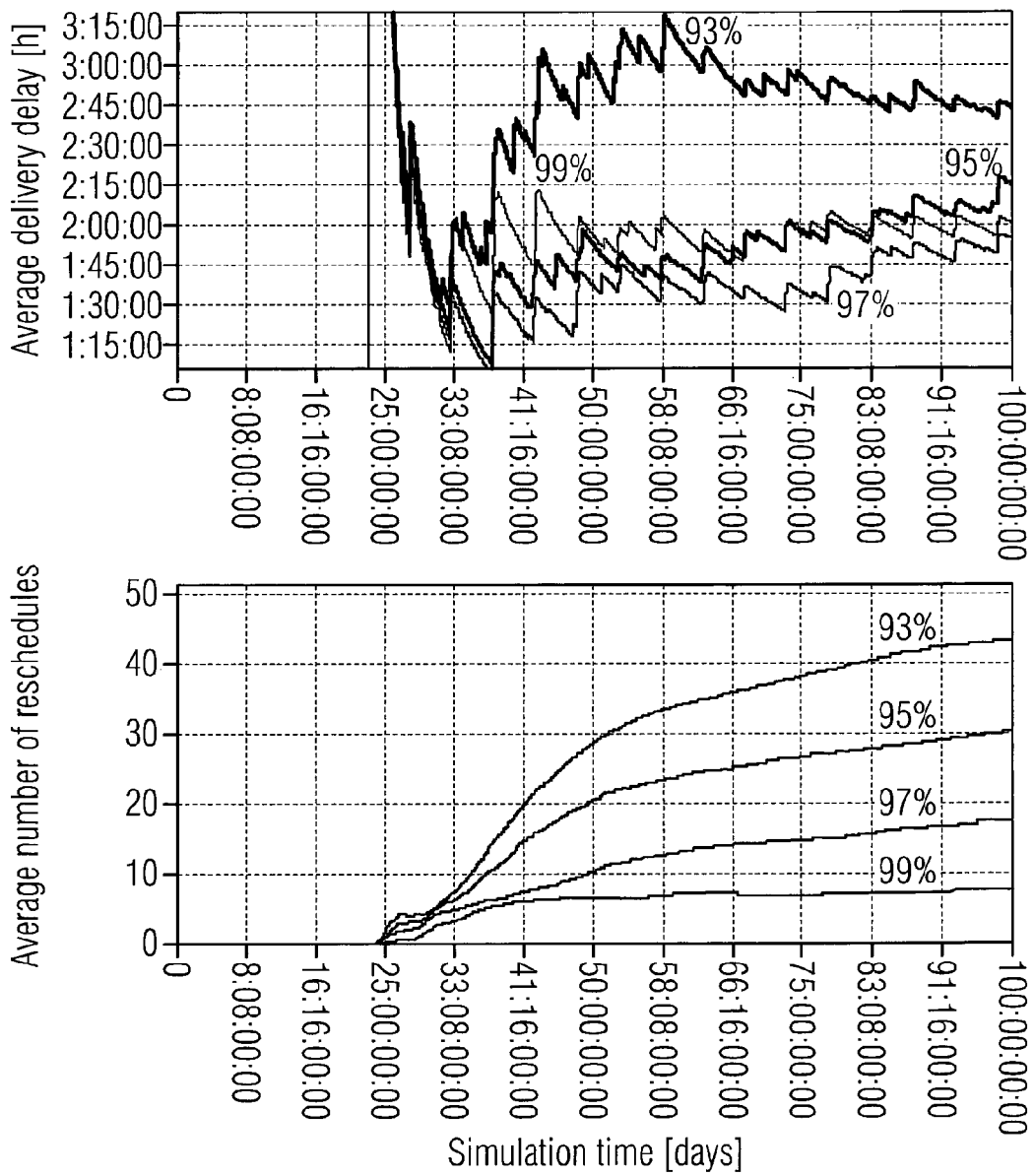

RE-SEQUENCING OF CLIENT ORDERS UNDER CONTROLLED JUST-IN-SEQUENCE DELIVERIES FOR AVOIDING PRODUCTION DOWNTIME AND/OR PRODUCTION REWORK DUE TO MISSING AND/OR DEFECT PARTS

BACKGROUND OF THE INVENTION

Field of the Invention

The present invention relates to a method for the production of a product in a manufacturing environment according to an individualized client order, said product comprising a number of client specific components that have to be supplied by at least one supplier.

Up to date production entities are distributed globally though intensively coupled. This coupling is mainly caused by strongly reduced time and stock buffer which are located at interfaces of the process within the same and in-between these production entities as a consequence of the lean management philosophy.

Simultaneously, an increased individualization of the demand forces the companies to expand their product portfolios. Hence, a specification of the client's demand is shifting more often from the OEM (i.e. car manufacturer) to the first tier who supplies important components (i.e. driver seats) for the OEM.

The first tier suppliers require both stability in planning and time for the execution of their own processes—from their own supply chain to the final delivery. Therefore, the OEM freezes its fine tuning of the order management a couple of days prior to the eventual start of the production. During that time span, the customized components are manufactured and by use of just in sequence delivery (JIS delivery) synchronously to the scheduled production sequence at the OEM provided so that the final customized product can be correctly assembled and eventually manufactured.

Due to these trends, the delivery sequence without keeping a buffer of components on the stock are prone to disturbances during the frozen interval in a sense that the components from the first tier may not be delivered in due time. Each instability in the supply chain of the OEM usually causes at the OEM a production shortfall due to missing and/or defect components/parts. Missing parts usually cause contractual penalties at the supplier as well as a retardation of the delivery from the OEM to the client who ordered the product initially. In order to correct faulty products, it has to be reworked at additional expenses once the correct component is provided by the supplier.

A broad field of possible strategies against material and component shortage is offered by preventive and strategic measures taken for the supply chain risk management. Strategies such as dual sourcing or extended stocks providing improved supply security are generally sumptuous and not always reasonably applicable.

In order to actively prevent from production shortfall due to missing and/or defect parts, a manufacturer applies an emergency strategy when the supply chain is disturbed seriously. Typical measures in this sense are the demand for exceptional transports for the provision of the product in due time thereby costs then often play a subordinated roll.

A further option for the prevention of missing parts is the introduction of buffers directly aligned with the production line. This measure enables the OEM to remove production orders being tainted with JIS missing parts from the production schedule and to amend the sequencing of the production accordingly. Consequently, production orders initially having a later date are disadvantageously produced now earlier to fill the gap caused by the removal and secondly a response has to be given to the question at which place the removed production order can be re-scheduled in the product production pipeline.

Further, the prevention of production shortfalls leads nowadays to amendments in the sequencing which appears to be uncontrolled and inefficient. This deficiency causes additional efforts for the internal coordination within the production environment in order to synchronize the right components from the supplier with the intended product. In practice, missing parts therefore lead to incomplete products which leave the production having the status "not completed yet". These products have to be re-worked as soon as the missing part has been received. Again, additional costs and further delay jeopardizes the delivery date to the customer.

BRIEF SUMMARY OF THE INVENTION

It is therefore an objective of the present invention to provide a system and a method for an improved re-sequencing of client orders which are charged with the deficiency of missing JIS parts which have not been deliverable in due time according to the planned production sequence or which have been delivered in due time but have a defect.

This objective is achieved according to the present invention by a method for the production of a product in a manufacturing environment according to an individualized client order, said product comprising a number of client specific components that have to be supplied by at least one supplier, said method comprising the steps of:
at engineering level:
  a) determining a production sequence for the product, thereby defining milestones in the production sequence for the supply of the client specific components;
  b) determining the delivery time for the at least one supplier, thereby defining a time period which the at least one supplier requires for the production of the client specific component;
  c) defining a frozen period for the production sequence which is aligned with the longest delivery time the at least one supplier has;
  d) dividing the frozen period into a number of sub-sequences being aligned with the variations of the delivery time for the components of the at least one supplier;
at production level during the execution of the production sequence:
  e) distinguishing the sub-sequences into either a totally permutable sub-sequence hereinafter referred to as TPS or a partially permutable sub-sequence hereinafter referred to as PPS;
  f) monitoring the supply process of the client specific components in view of the milestones and determining whether a critical deviation in the supply process occurs;
  g) in case of an absence of the critical deviation, producing the product according to the scheduled production sequence;
  h) in case of the occurrence of the critical deviation, executing the following steps in order to re-sequence the initial production sequence:
    i) determining which client orders are concerned and which sub-sequences are concerned;

j) classifying the critical deviation as to be caused by either a delayed supply of the component or the supply of a defect component;

k) for both classes of critical deviations applying a leap strategy to shift the concerned client order to the last position of the PPS; or l) in case of delayed components applying a step strategy to shift the client order to the position of the PPS that accommodates the expected or confirmed delivery delay or applying a hop strategy for the re-sequencing of the concerned client product order to a position of the PPS that is determined based on the order delivery time to the customer, and m) in case of defect components applying the step strategy to shift the client order to the next position in the initial production sequence having the same set of components thereby annexing the components from the later production order or applying the hop strategy for the re-sequencing of the concerned client product order to a position of the PPS that is determined based on the order delivery time to the customer and where one of the later client production orders having the same set of components.

In some manufacturing environments, a focus in the production strategy can be applied for a production sequence that remains even under disturbances caused by delayed components and/or defect components relatively stable. Therefore, a preferred embodiment of the present invention provides for a method wherein the leap strategy considers the delayed supply of the component and the supply of a defect component parts the same and the concerned production order is shifted in the production sequence to the end of the partially permutable sub-sequence of the respective supplier and any additional already planned production orders are incremented by one position in the production sequence wherein the last planned production order within the longest partially permutable sub-sequence is then transferred to a totally permutable sub-sequence. The leap strategy therefore results in only few re-sequencing, but a comparably poor delivery reliability.

Another approach could focus more on the fidelity to the delivery dates that have been agreed upon in the client orders. A preferred embodiment for this approach provides a method wherein the step strategy distinguishes among the delayed supply of the component and the supply of a defect component. In case of the occurrence of a defect component, the concerned production order is removed from the current position in the production sequence and is re-positioned at the next position representing a production order requiring the same set of components. Thereby, the component(s) from the later production event are transferred into the re-scheduled one. In other words, the re-scheduled order annexes the components from the formerly later scheduled production order. This procedure is repeated until the end of the respective partially permutable sub-sequences is reached.

In case of a delayed component, the concerned production order is shifted into the next possible sequence position which has a difference in the time scheduled by at least the length in time of the expected or confirmed delivery delay period wherein all sequenced orders of the longest PPS as of that sequence position are incremented, too, until the last subsequent production order is moved into the TPS. The application of this strategy results in a higher nervousness (many sequence variations) advantageously being align with a higher delivery reliability.

A further approach can be laid on a balance situation regarding the number of amendments in the sequencing and the fidelity to the delivery dates. For this approach, a preferred embodiment of the present invention provides for a method wherein the Hop strategy distinguishes among the delayed supply of the component and the supply of a defect component and in case of the supply of a defect component shifts the concerned production order not to the next production order having an identical set of components but farer into the future on the basis of a predetermined criteria resulting in bigger jumps in the production sequence and when a new position is eventually found, the components of the subsequent production order with the same set of components are transferred to the previously shifted concerned production order; and in case of the delayed supply of the component, a jump along the partially permutable subsequences is proceeded according to a predetermined criteria instead of amending all sequenced production orders having an identical set of components. This approach therefore combines to a certain extent the extrema of the Leap and the Step strategy. A better tradeoff among the number of amendments in the production sequence and the delivery reliability to the client can be achieved.

A possible solution for finding this trade-off can be achieved when a dynamic strategy can be applied deciding on the grounds of the due date whether the step or the leap strategy is employed according to the following algorithm:
IF Current.Time+Leap.Completion.Time>Order.DueDate
THEN use step strategy
ELSE use leap strategy.

In other words, the "nervous" step strategy is preferred over the "calm" leap strategy when the current time plus the time interval of the shift of the concerned order in the production sequence to the end of the partially permutable sub-sequence of the respective supplier is later than the delivery date for the concerned order.

With respect to the criteria and the preparation of the re-sequencing strategy, the way of subdividing the frozen period into a number of different subsequences may advantageously contribute to the success of the re-sequencing. Therefore, a further preferred embodiment may provide for a method wherein the TPS comprises all client production orders, for which the production of individualized components have not been started yet or the order to produce the individualized component has not been placed yet with the respective supplier. Accordingly, the PPS comprises all client production orders for which at least one individualized component is already under production.

BRIEF DESCRIPTION OF THE SEVERAL VIEWS OF THE DRAWING

Preferred embodiments of the present invention are hereinafter explained in more detail with respect to the attached drawings which shows in:

FIG. 7 is a similar schematic showing the performance of the dynamic strategy in comparison with FIG. 6 and a graph with a number of resulting reschedules.

DESCRIPTION OF THE INVENTION

Figure 1:
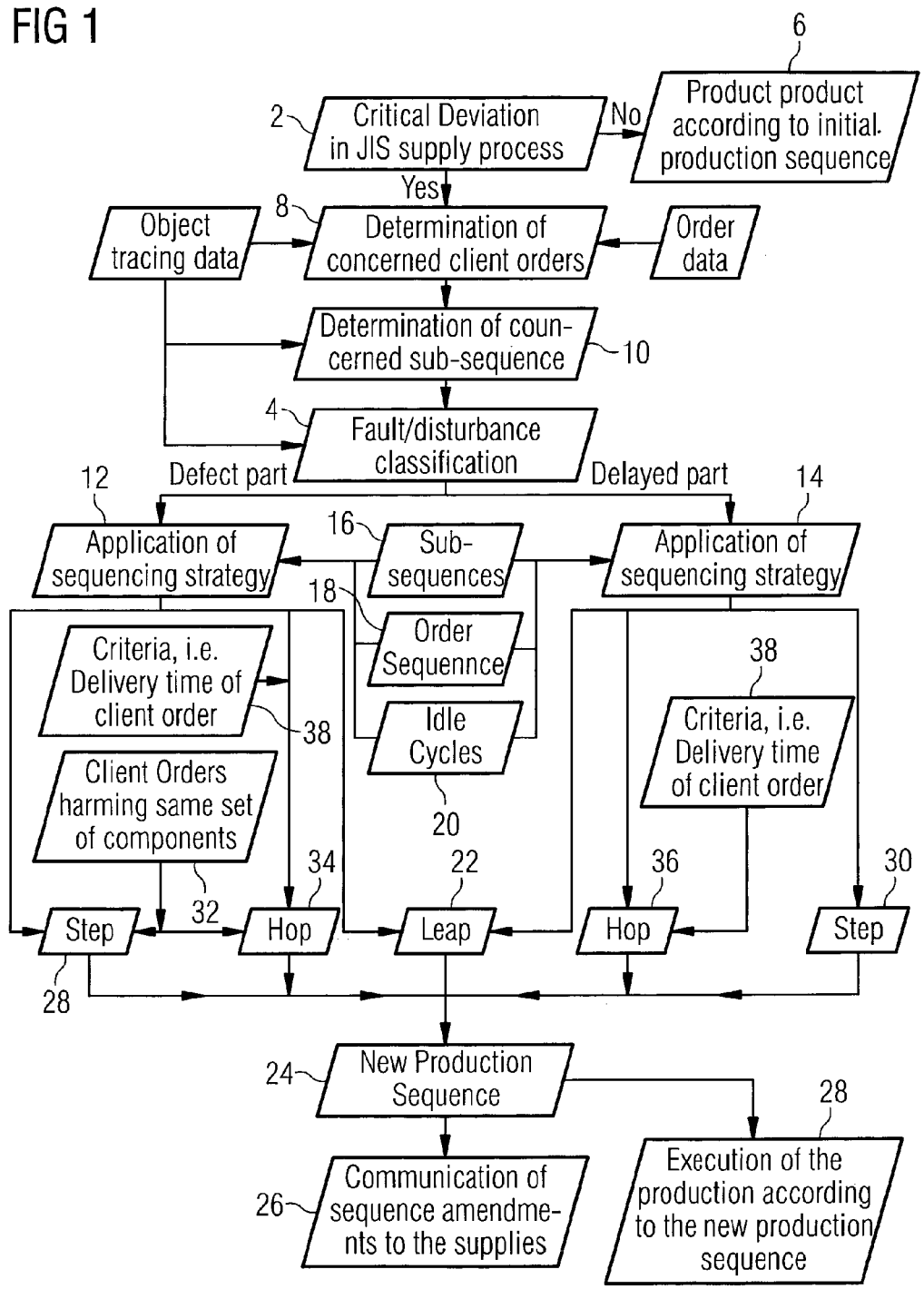
FIG. 1 schematically a flowchart of the substantial steps for the production of a product in a manufacturing environment according to an individualized client order.

FIG. 1 represents schematically a flowchart for a typical example for this production re-sequencing. The example here is a car which is usually highly client individualized and requires during the production a vast number of components supplied by an external supplier.

The present invention therefore deals in fact with an approach for the re-sequencing of client production orders where client-individualized JIS components due to disturbances have not been delivered in due time according to the planned production schedule or have been delivered, but are defect.

For the solution of said problems, a method and system are provided that perform in general three major steps which are explained in more detail with reference to the attached drawing wherein the flow charts starts with the process step 2 of monitoring for critical deviations of the JIS supply process.

Firstly, by the introduction of the concept of differently permutable sub-sequences, the frozen time zone is divided into a plurality of sub-sequences of different length in time wherein the length in time is adapted to the time variants in the re-planning process. Preferably, there exist two different sub-sequence types. A first totally permutable sub-sequence (TPS) comprises client production orders, for which the production of individualized components have not been started yet. A second partially permutable sub-sequence (PPS) comprises client production orders for which at least one individualized component is already under production.

Secondly, by use of a knowledge based model, the consequences of a disturbance are classified in step 4 to be caused either by delayed supply or by defect parts. Therefore, the disturbances with respect to the supply of components are divided into two classes of failed activities which form the basis for the re-sequencing. Of course, if in process step 2 the absence of any disturbances is determined, the production process is executed in process step 6 according to the initially planned production sequence. In case a disturbance is identified, in process steps 8 and 10 the impact of the disturbance is identified in terms of the concerned client orders (process step 8) and the concerned sub-sequences (process step 10).

Thirdly, after determining the type of distortion (either delayed component or defect component) combining the type of sub-sequence (either TPS or PPS) with the status of the supply (either delayed component or defect component) leads to the generation of three possible algorithms for the re-sequencing of the client production order. The detailed steps are explained hereinafter.

A client production order typically consists of a tuple of components whereas some components are produced according to the selected specification of the client and delivered via JIS. The present invention takes at this stage into account that the time length of the frozen time period of the OEM has to be aligned with the delivery time of that JIS supplier having the longest delivery time. Said JIS supplier will be the first one to start the buying process and to produce the ordered component(s). Usually, the OEM communicates simultaneously the planned production sequence to each of its suppliers. Some of them have in general significantly lower delivery times and—in order to avoid high stocks—starts their production activities at a later stage.

The delivery time variations therefore lead to different time lengths for the sub-sequences of JIS components which run synchronously to the order sequence of the OEM. Within the sub-sequences, a distortion among the real and the planned process evolution being based on stochastic impacts may arise leading to hazarding the supply of the considered JIS components in due time.

For the re-sequencing of the concerned client production orders the status of the JIS components have to be reflected. The second step in this regard is the conclusion that the status of a JIS component can be always deducted on a temporal aspect in relation to the subsequent processes: either the JIS component being subject to a disturbance arrives too late or we have to deal with a defect part. The latter trigger the renewal of the complete production process at the supplier because the number of parts delivered to too low or has not been delivered with the required quality of the parts. In both cases, the position of the production sequence can not be maintained and a re-scheduling is required.

Consequently, the question arises where to re-schedule the suspended production order and what might be the possible implications for the subsequent production orders. In view of these circumstances, three options for a re-sequencing algorithm show up which partially depend on the identified disturbance class, either delayed component/part or defect component/part which is represented by a process steps 12 for the defect components and a process step 14 for the delayed components. The process steps 12 and 14 comprise as input data the current sequence of sub-sequences (box 16), the order sequence (box 18) and the idle cycles (box 20).

Leap Strategy (Process Step 22):

Applying the Leap strategy, delayed parts and defect parts are considered to have the same effect on the sequencing (For that reason, both arrows stemming from the process steps 12 and 14 end up in the same box for the Leap strategy process step 22. The concerned production order is shifted in the production sequence to the end of the partially permutable sub-sequence of the respective supplier ("Leap"). In case of a defect, the production of the required component is re-started. In case of a delay, the affected component is temporarily stored and delivered according to the new schedule. Any additional already planned production orders are incremented by one position in the production sequence. The last planned production order within the longest partially permutable sub-sequence is then transferred to a totally permutable sub-sequence where all positions in the production sequence are completely flexible and not fixed yet. A re-sequencing for these production orders therefore can be easily established. The leap strategy therefore results in only few re-sequencing, but an relatively poor delivery reliability. The application of the Leap Strategy leads to a new production sequence (process step 24) having two subsequent actions. First, in process step 26 the new production sequence is communicated to the concerned supplier(s). Secondly, the production process is now executed according to the new production sequence Step Strategy (Process Step 28 for the Defect Component Class and Process Step 30 for the Delayed Component Class):

With the occurrence of a defect part, the production order is according to the Step strategy removed from the current position in the production sequence and is re-scheduled at the next position representing a production order requiring the same set of components. The input on the client orders having the same set of components as the remove production order is delivered by process step 32. This repositioning enables the supplier to transfer the component(s) from the later production event into the re-scheduled one. This procedure is then repeated for the production order which now has a component vacancy due to the transfer of the component to the previously re-scheduled production order. In other words assuming to have production orders n, n+1, n+2, ... n+m with an identical set of components, a removed order n takes the later position of the scheduled production order n+1 and uses its component c+1, wherein the later production order n+1 takes over the later position of the production order n+2 and uses its component c+2. Now, the later production order n+2 takes over the later position of the production order n+3 and uses its component c+3 and so on. This procedure is repeated until the end of the respective partially permutable sub-sequence is reached. Analogously to the Leap strategy, all sequence positions of the client production orders are incremented by one position. In case of a delayed component, the production order is shifted into the next possible sequence position which has a difference in the time scheduled by at least the length in time of the expected (or confirmed) delivery delay period. All sequenced orders of the longest PPS as of that sequence position are incremented, too, until the last subsequent production order moves into the TPS.

The application of this strategy results in a higher nervousness (many sequence variations) advantageously being align with a higher delivery reliability.

Hop Strategy (Process Step 34 for the Defect Component Class and Process Step 36 for the Delayed Component Class):

In case of a defect component disturbance, the Hop strategy applies a quiet similar procedure as compared to the Step strategy. The difference is that a production order is not shifted to the next production order having an identical set of components but is shifted farer into the future on the basis of a predetermined criterion delivered from process step 38 resulting in bigger jumps in the production sequence. For example, possible criteria are production specific circumstances or the advised delivery date. The later this delivery date is, the more the production order can be shifted in the production sequence. When a new position is eventually found, the components of the subsequent production order with the same set of components are transferred to the previously shifted production order. This procedure more or less resembles then the application of the Step strategy.

The removed production order n+1 (which has lost its components to the previous production order n) is then introduced later in the production sequence thereby applying the same Hop strategy approach (bigger jumps could be possible again).

In case of a delayed component, jumps along the partially permutable sub-sequences are proceeded according to a predetermined criteria (from process step 38) instead of amending all sequenced production orders having an identical set of components. A better tradeoff among the number of amendments in the production sequence and the delivery reliability to the client can achieved.

So-called "idle cycles" are a further important aspect for all three strategies. An idle cycle appears when a production order is removed from its current position of the production sequence. When a production order is now shifted towards the future, the other production orders move up according to the applied strategy.

As soon as a production order moves up into an idle cycle, the re-sequencing of the respective strategy can be disabled. The launch of the re-sequencing requires as a pre-requisite that a problem in the supply chain is already identified (process step 4) and the conclusion is derived thereof that one or more production orders (process step 8) cannot be fulfilled in due time. To achieve this goal, a permanent monitoring, i.e. by means of AutoID technology, of the supply chain is required. From the monitoring of the supply status of a component, a conclusion can be made on the question whether a disturbance is present or will most probably arrive (process step 2). These pre-requisite have been considered to be granted in this context.

Figure 2:
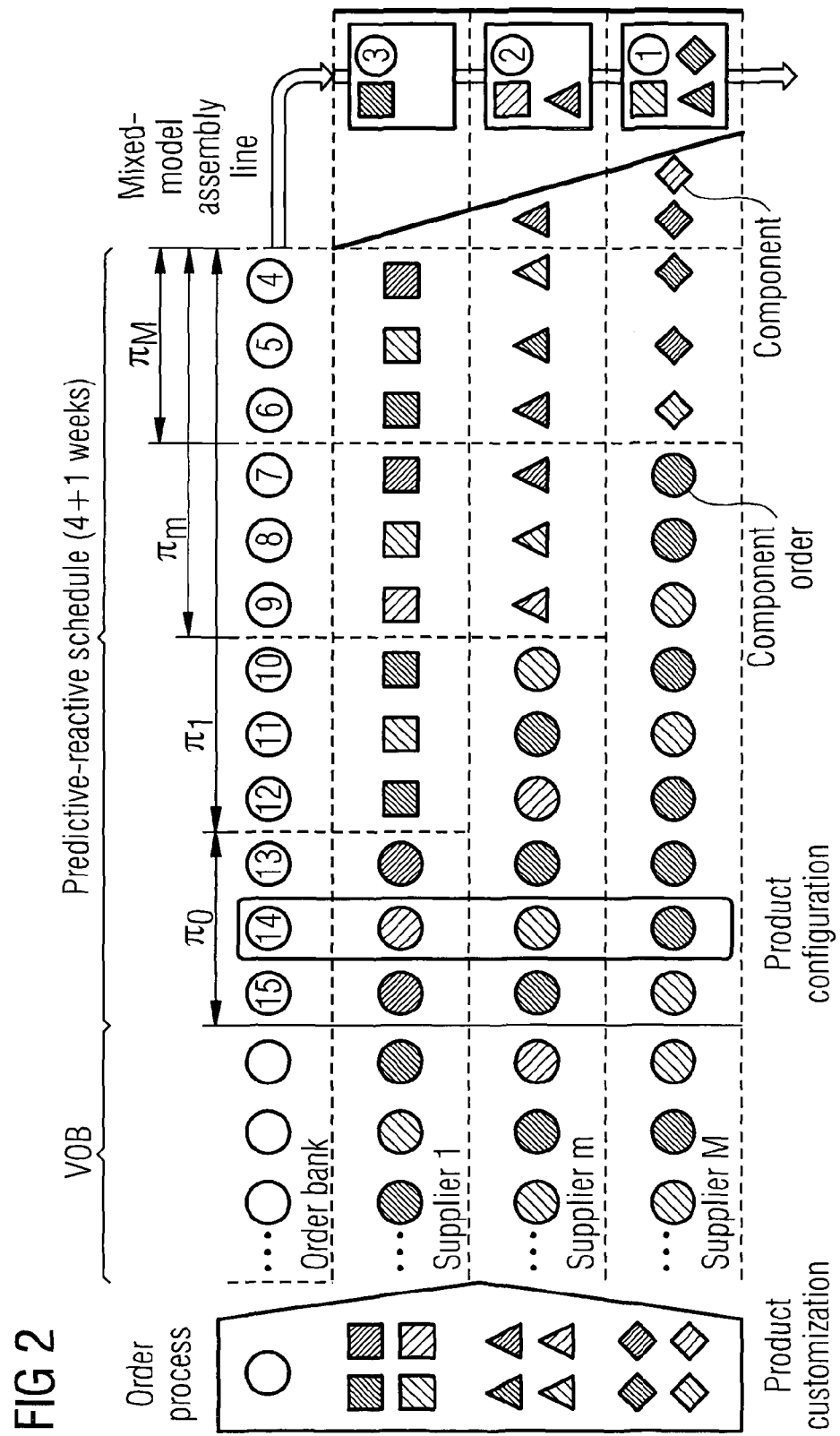
FIG. 2 an mixed-model assembly line (MMAL) model with JIS component deliveries.

Some further preferred examples of the present invention are explained hereinafter. As shown in FIG. 2, during the order process customers choose their individual configurations from various options and specify a due date $d_j$. The virtual order bank (VOB) contains all unscheduled customer orders. From this VOB the unscheduled customer orders are then sequenced on a weekly basis to fix the production program of week 5 in the present example of FIG. 2. Scheduling is based on priority, which is determined by the closest due dates. The preceding four weeks were scheduled earlier and constitute the so-called frozen zone, which provides planning stability for suppliers. It is a pearl chain of over 1200 customer-specific orders that will be assembled over four weeks. The length of the frozen zone is roughly determined by the JIS supplier with the longest order-to-delivery (OTD) time—about 18 days in the present case study. All of the sequenced orders J ($1 \leq j \leq J$) are associated with a fixed sequence position $s_j$ and release date $r_j$ when final assembly is scheduled to start. Around 10 components of the tractor (e.g. engine) are delivered JIS from M suppliers ($1 \leq m \leq M$) with none constituting an optional feature. Each supplier delivers a component family with N products ($1 \leq n \leq N$) from which a customer chooses a specific version n. Consequently, the mixed-model assembly line (MMAL) produces a total of $n^m$ possible configurations. The sum of components ordered by a customer constitutes the individual product configuration that is sourced JIS as shown in FIG. 2.

Depending on the individual delivery time $\zeta_n$ of component $n_{mj}$ there exist three distinct cases of how the M customer-specific sequences merge on the MMAL: (i) Component and order are ready so that assembly proceeds as planned; (ii) Component is ready before the customer order is scheduled at the respective station, resulting in its temporary storage; (iii) Component is delayed but order is scheduled to be processed. In accordance with industry practice, it is assumed for the last case that processing continues and that the incomplete workpiece is subsequently send to a rework area. It is assumed that the lack of one component does not compromise the assembly of another. Completed orders are immediately shipped to the customer. Since a JIS setup is modelled, the production processes of supplier and buyer are insofar synchronized that production of $n_{mj}$ at the supplier is only triggered when the distance to $r_j$ is the supplier-individual $OTD_m$.

Figure 3:
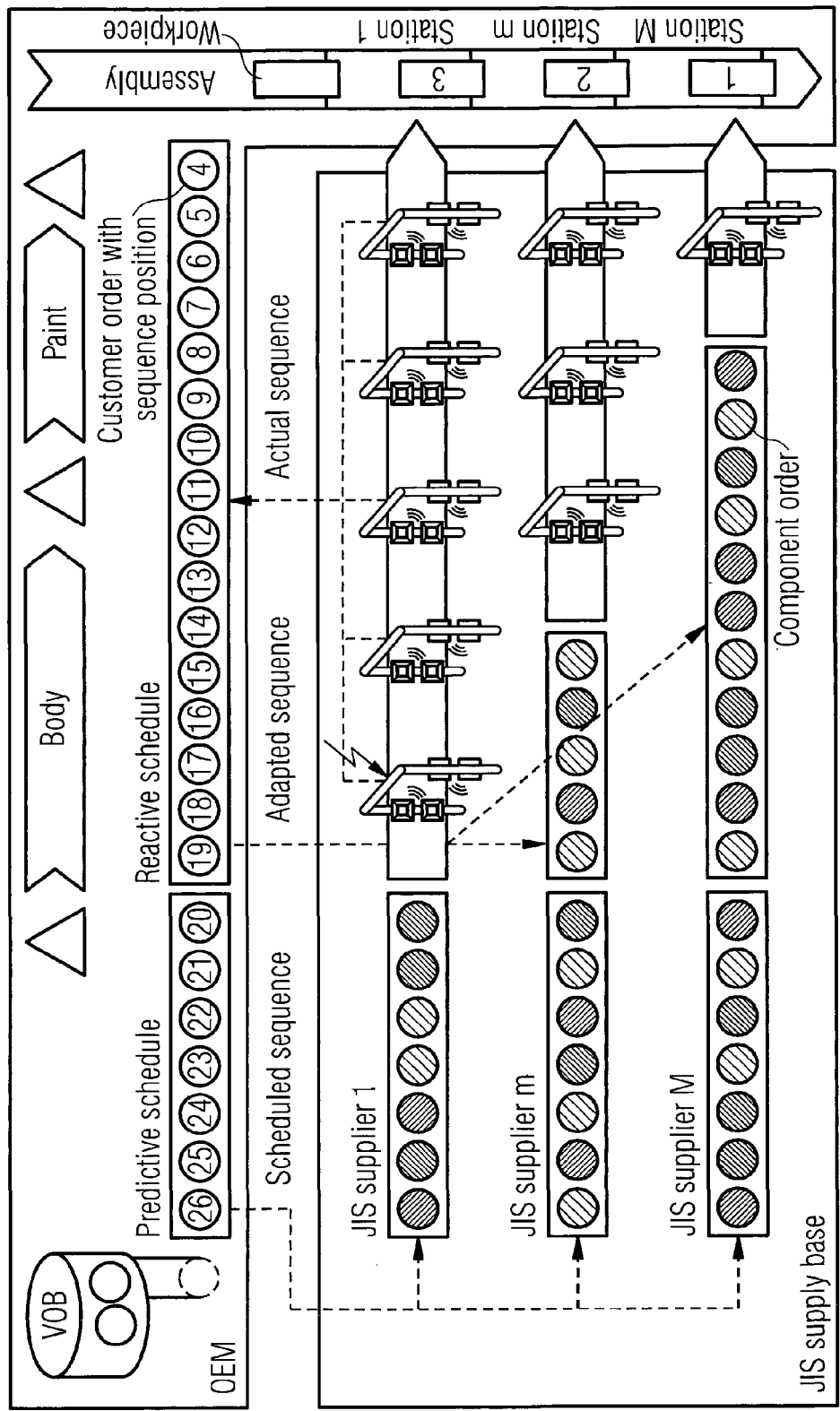
FIG. 3 schematically a predictive-reactive scheduling in monitored networks.

Due to stochastic influences, JIS deliveries are unreliable to a small percentage, so that the delivery time $\zeta_n$ of component $n_{mj}$ can take a random non-negative real value that is larger than the $OTD_m$. Thus, component status and the sequence position of the customer order can get out of sync, making its current assembly schedule obsolete. In order to avoid rework due to delivery delays, a rescheduling model is proposed. To this end, the model is enhanced with real-time component monitoring capabilities (see FIG. 3)

that allow feedback when JIS supply processes fail to bring the right product, at the right time, to the right place, in the right quality and quantity. Supply-side problems have a temporal dimension and are noticed at monitoring points through a delayed or missing reading of a component that ultimately materializes at the OEM through a delivery delay or delivery failure—the latter implying that components are of the wrong quantity or quality. As illustrated in FIG. 3, given that a SCEM system (supply chain event management system) finds that actual JIS component status $n_{mj}$ and planned assembly sequence position $s_j$ of the customer order j are out of sync, a rescheduling is triggered.

During rescheduling the affected order is first removed from the planned sequence. The model assumes that it can then only be postponed because otherwise the whole supply base must provide components that are already in production faster than originally planned, which compromises quality.

The subsequent steps then aim at reinserting the order into the existing sequence and are based on the multiple permutable subsequences concept. It builds on the insight that JIS suppliers require different OTD times and thus, trigger component production for the same customer order at different times. Due to the asynchronous component production starts the approach divides the order sequence into parts of decreasing rescheduling flexibility (sub-sequences). They go from the totally permutable subsequence $\pi_0$ (TPS) where a re-scheduling is totally flexible to the partially permutable subsequences (PPS) where some to all components of an order are fixed and in production (compare FIG. 2). For instance, FIG. 3 shows that an early event at supplier 1 can be communicated to the other suppliers that have not started production on the affected customer order to adapt their sequence.

Figure 4:
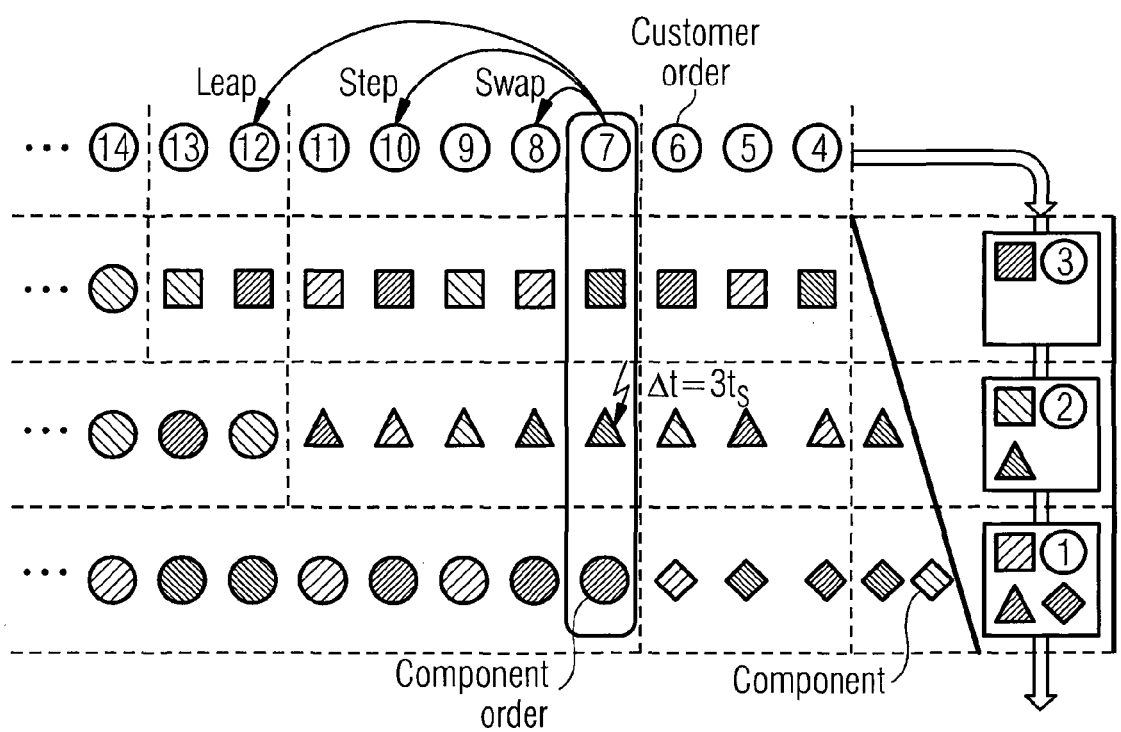
FIG. 4 schematically the rule-based order re-sequencing strategies according to the Hop-, Step- and Leap-approach.
Figure 5:
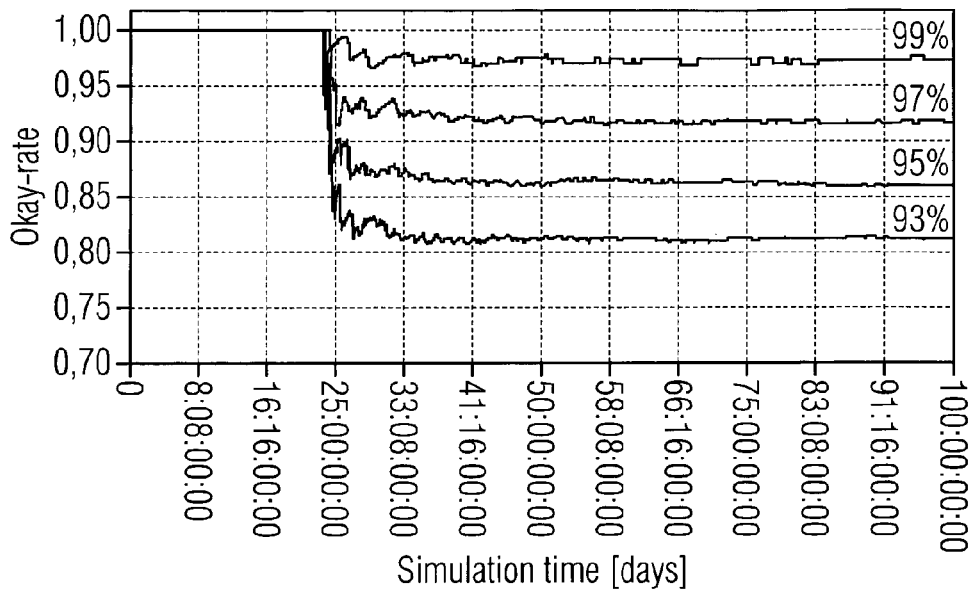
FIG. 5 schematically the Okay-rate for different supply chain reliabilities.

To include the implications of the multiple permutable subsequences approach with the individual status of the various JIS components, a rule-based rescheduling model has been selected. It is based on the order step size when choosing a position for reinserting an order. As shown in FIG. 4, the leap strategy maximizes the distance of the affected order from its former position by moving it to the sequence position that marks the end of the PPS that contains the affected JIS component. For a delayed component this guarantees enough time to be ready before the order is scheduled for assembly again while a failed component can be reproduced. Other components that are in production and required by the resequenced order are temporarily stocked after completion while the production start of component orders is delayed. Conversely, the step strategy aims at reinserting an order as close as possible to its former position. Given that a component is delayed the range has a lower bound of the quantified delivery delay (e.g. 3 positions in FIG. 4) while for a failed component it is the respective OTD time of the supplier. If necessary, however, these bounds can be avoided through a component swap where the step strategy looks for the next order in the sequence that requires the same component version and swaps their order assignments (annexion of the set of components by the re-scheduled production order).

Rescheduling an order has two consequences (see FIG. 4):
(i) its reinsertion into the sequence requires the displacement of another order; and
(ii) its removal leaves an empty sequence position.

The former is addressed by increasing the sequence position for all orders following the reinsertion that are already part of a PPS until one order (usually the last order) is moved into the TPS. The empty position is filled in case another order further down in the sequence is affected by an event and thus triggers another rescheduling. Performance is measured through several indicators. First, the okay-rate measures the number of workpieces that leave assembly completed. Second, the average delivery delay per workpiece measures optimality. Third, the average reschedules per workpiece measures nervousness. The re-scheduling strategy thereby usually aims for the trade-off that exists between schedule optimality and nervousness. Since the step and leap strategies represent to opposed extremes, the former results in good due date adherence but high schedule nervousness while it is vice versa for the latter.

To this end the dynamic strategy decides on the grounds of the due date which strategy is employed:
IF Current.Time+Leap.Completion.Time>Order.DueDate
THEN use step strategy
ELSE use leap strategy For the evaluation, the model with the respective strategies was implemented into the discrete event simulation tool Plant Simulation from Siemens PLM Software. The MMAL is supplied by three JIS suppliers (drive, engine, and cabin) with a respective lead time of 18, 12, and 6 days. Each supplier offers four versions that are randomly chosen following a uniform distribution by the customer. Their orders arrive according to the Poisson process in mean intervals of 30 minutes. The order due date is uniformly distributed and bound between the minimum system OTD time (i.e. rush job) and it's double on the upper bound. The MMAL assembles 64 different product variants and runs at a tact time of 30 minutes. If during assembly components are missing, the order is moved to the rework area. The simulation ran for 100 days, including a simulation calibration phase of 30 days. The delivery reliability of the individual JIS supply chains was varied in steps of 2% from 99% to 93%. The remaining percentage share for the probability of an event was divided between 10% for a failed component and 90% for a delayed one. The length of the delay is modelled using an exponential distribution with bounds in the range Ex[2, ..., 48 h]. Workpieces (i.e. chassis) onto which the JIS components are mounted are sourced without delay from the buffer between paint and assembly and provided in the scheduled sequence.

Figure 6:
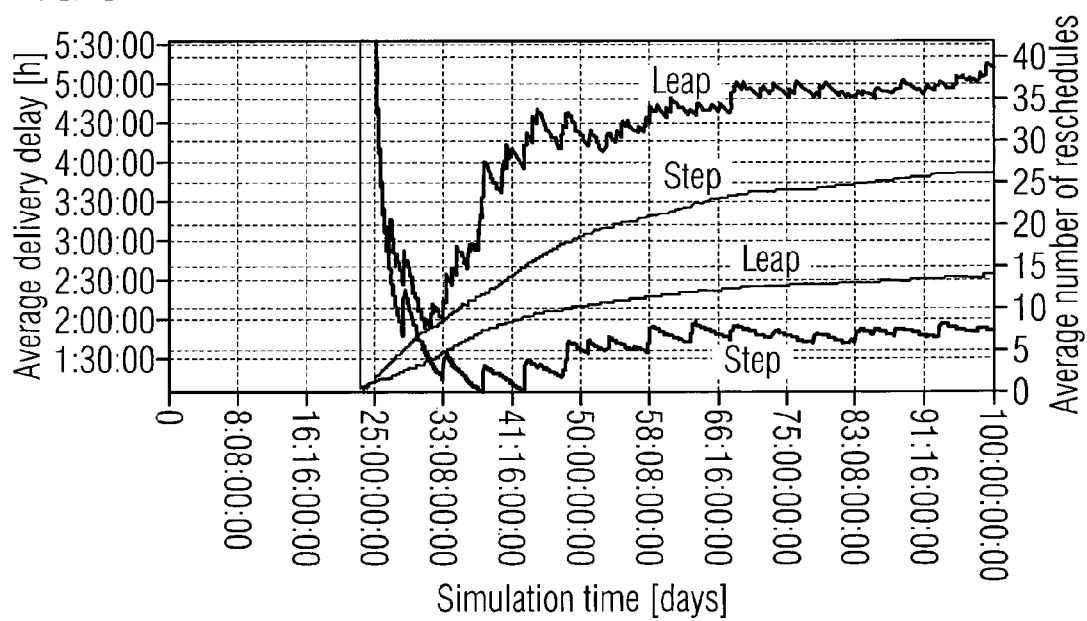
FIG. 6 schematically the performance of the dynamic strategy for different supply chain reliabilities.

FIG. 6 shows the impact of JIS deliveries that are unreliable to different degrees. As expected from reliability theory and serial systems, a 2% drop in reliability results in a disproportional drop of the okay-rate—accompanied by a rise in rework load and a slight increase in the average delivery delay. Considering that on average 17 parts are sourced JIS from 17 different suppliers, the respective supply chains have to be highly reliable to avoid rework and delivery delays.

FIG. 6 illustrates the aforementioned trade-off through the application of the leap and step strategies for a robust scenario where JIS deliveries are 97% reliable. Both strategies virtually eliminate rework. However, while 'leap' results in minimal reschedules per workpiece but high delivery delays, the opposite is true for 'step'. Thus, in industry the former results in poor customer satisfaction while the latter will inevitably incur error costs due to frequent schedule overhauls. FIG. 6 underlines that neither strategy represents a feasible option in praxis. To this end, the dynamic strategy aims at balancing this trade-off.

The comparison of FIGS. 6 and 7 reveals that the dynamic strategy results in a more balanced performance for 97% reliable supply chains. While delivery delay basically attains the level of the step strategy, the rescheduling frequency for the dynamic strategy is situated between the others. The same accounts across reliability settings: The delivery delay attains reasonable levels while rescheduling frequency—especially for low reliabilities—exceeds acceptable limits. The results indicate that the proposed rule is applicable for reliable supply chains but becomes too nervous for event-prone ones.

Modern assembly systems are marked by just-in-sequence component deliveries. Trends like global sourcing and lean management, however, have virtually eliminated the scope for variation in these processes. Thus, small and large events alike cripple the synchronized merging of the various sequences that result in costly line stoppages and/or rework. The examples mentioned above illustrate through a supply-assembly model that tightly integrated supplier-buyer relationships with unreliable processes cause a disproportionate increase in rework. The model is then enhanced with monitoring capabilities that allows a supply chain event management (SCEM) system to identify an event early and enact reactions. Accordingly, the solution presents rule-based resequencing strategies that build on the multiple permutable subsequences concept. It restricts the unconditional resequencing of orders when customer-specific components go into production at the supplier. The evaluation shows that neither minimizing nor maximizing the distance to the former position of an order is a feasible strategy in industry when employing the bi-criteria approach of schedule nervousness and optimality.

Thus, the present invention introduces a dynamic strategy that assigns an approach based on the order due date. It finds that performance improves, making it a feasible strategy for robust supply chains. When these become increasingly unreliable, however, performance in regard to nervousness is intolerable. The issue can be resolved by skewing the sensitivity of the dynamic rule towards the maximization of the distance. Further, the model can be enhanced with a criterion-based strategy that varies the distance to the former sequence position. Furthermore, industry proposed to include planning with slack by leaving intentional sequence gaps during scheduling.

Distinguishing among a defect component and a delayed component as a specific deviation in the evolution of the production process, coupled with the concept of differently permutable sub-sequences, offers the basis for the generation of algorithms for the re-sequencing of the client production order sequences as explained above with reference to the attacked drawings.

The invention claimed is:

1. A method for producing a product in a manufacturing environment according to an individualized client order, the product including a plurality of client specific components that must be supplied by at least one supplier, the method comprising:
   a) at engineering level, determining a production sequence for the product, thereby defining milestones in the production sequence for a supply of the client specific components;
   b) determining a delivery time for the at least one supplier, thereby defining a time period which the at least one supplier requires for the production of the client specific component;
   c) defining a frozen period for the production sequence, the frozen period representing a longest allowable delivery time allotted the at least one supplier;
   d) dividing the frozen period into a plurality of sub-sequences aligned with variations of the delivery time for the components of the at least one supplier;
   e) at production level during an execution of the production sequence, distinguishing the sub-sequences into either a totally permutable sub-sequence TPS or a partially permutable sub-sequence PPS;
   f) monitoring a supply process of the client specific components in view of the milestones and determining whether a critical deviation in the supply process occurs;
   g) in case of an absence of the critical deviation, producing the product according to the scheduled production sequence; and
   h) in case of an occurrence of the critical deviation, executing the following steps in order to re-sequence an initial production sequence to generate a re-sequenced production sequence:
      i) determining which client orders are concerned and which sub-sequences are concerned;
      j) classifying the critical deviation as having been caused by a delayed supply of the component or by a supply of a defective component; and
      k) for both classes of critical deviations applying a leap strategy to shift the concerned client order to a last position of the PPS; or
      l) in case of delayed components, applying a step strategy to shift the client order to the position of the PPS that accommodates an expected or confirmed delivery delay, or applying a hop strategy for re-sequencing the concerned client product order to a position of the PPS that is determined based on the order delivery time to the customer; and in case of defective components, applying the step strategy to shift the client order to next position in the initial production sequence having a same set of components thereby annexing the components from a later production order or applying the Hop strategy for re-sequencing the concerned client product order to a position in the PPS that is determined based on the order delivery time to the customer and where one of the later client production orders has the same set of components;
   in the leap strategy considering the delayed supply of the component and the supply of a defective component as being equal and shifting a respectively concerned production order in the production sequence to the end of a sub-sequence of the respective supplier and incrementing any additional, already planned production orders by one position in the production sequence, and then transferring the last planned production order within the longest partially permutable sub-sequence to a totally permutable subsequence TPS; and
   in the case of the absence of the critical deviation, producing the product according to the scheduled production sequence, and in the case of the occurrence of the critical deviation, producing the product according to the re-sequenced production sequence.

2. The method according to claim 1, wherein the TPS comprises all client orders, for which the production of individualized components have not been started yet.

3. The method according to claim 1, wherein the PPS comprises all client orders for which at least one individualized component is already in production.

4. A method for producing a product in a manufacturing environment according to an individualized client order, the product including a plurality of client specific components that must be supplied by at least one supplier, the method comprising:

a) at engineering level, determining a production sequence for the product, thereby defining milestones in the production sequence for a supply of the client specific components;
b) determining a delivery time for the at least one supplier, thereby defining a time period which the at least one supplier requires for the production of the client specific component;
c) defining a frozen period for the production sequence, the frozen period representing a longest allowable delivery time allotted the at least one supplier;
d) dividing the frozen period into a plurality of sub-sequences aligned with variations of the delivery time for the components of the at least one supplier;
e) at production level during an execution of the production sequence, distinguishing the sub-sequences into either a totally permutable sub-sequence TPS or a partially permutable sub-sequence PPS;
f) monitoring a supply process of the client specific components in view of the milestones and determining whether a critical deviation in the supply process occurs;
g) in case of an absence of the critical deviation, producing the product according to the scheduled production sequence; and
h) in case of an occurrence of the critical deviation, executing the following steps in order to re-sequence an initial production sequence to generate a re-sequenced production sequence:
  i) determining which client orders are concerned and which sub-sequences are concerned;
  j) classifying the critical deviation as having been caused by a delayed supply of the component or by a supply of a defective component; and
  k) for both classes of critical deviations applying a leap strategy to shift the concerned client order to a last position of the PPS; or
  l) in case of delayed components, applying a step strategy to shift the client order to the position of the PPS that accommodates an expected or confirmed delivery delay, or applying a hop strategy for re-sequencing the concerned client product order to a position of the PPS that is determined based on the order delivery time to the customer; and in case of defective components, applying the step strategy to shift the client order to next position in the initial production sequence having a same set of components thereby annexing the components from a later production order or applying the Hop strategy for re-sequencing the concerned client product order to a position in the PPS that is determined based on the order delivery time to the customer and where one of the later client production orders has the same set of components;
  in the step strategy distinguishing between the delayed supply of the component and the supply of a defective component;
  in case of a defective component, removing the respectively concerned production order from the current position in the production sequence and repositioning at a next position representing a production order requiring the same set of components, thereby transferring the component from the later production event into the re-scheduled production event and repeating the step until the end of the respective partially permutable sub-sequences is reached; and
  in case of a delayed component, shifting the production order into the next possible sequence position which has a difference in the time scheduled by at least a length in time of the expected or confirmed delivery delay period wherein sequenced orders of a PPS are incremented, too, until the last subsequent production order is moved into the TPS; and
  in the case of the absence of the critical deviation, producing the product according to the scheduled production sequence, and in the case of the occurrence of the critical deviation, producing the product according to the re-sequenced production sequence.

5. A method for producing of a product in a manufacturing environment according to an individualized client order, the product including a plurality of client specific components that must be supplied by at least one supplier, the method comprising:
a) at engineering level, determining a production sequence for the product, thereby defining milestones in the production sequence for a supply of the client specific components;
b) determining a delivery time for the at least one supplier, thereby defining a time period which the at least one supplier requires for the production of the client specific component;
c) defining a frozen period for the production sequence, the frozen period representing a longest allowable delivery time allotted the at least one supplier;
d) dividing the frozen period into a plurality of sub-sequences aligned with variations of the delivery time for the components of the at least one supplier;
e) at production level during an execution of the production sequence, distinguishing the sub-sequences into either a totally permutable sub-sequence TPS or a partially permutable sub-sequence PPS;
f) monitoring a supply process of the client specific components in view of the milestones and determining whether a critical deviation in the supply process occurs;
g) in case of an absence of the critical deviation, producing the product according to the scheduled production sequence; and
h) in case of an occurrence of the critical deviation, executing the following steps in order to re-sequence an initial production sequence to generate a re-sequenced production sequence;
i) determining which client orders are concerned and which subsequences are concerned;
j) classifying the critical deviation as having been caused by a delayed supply of the component or by a supply of a defective component; and
k) for both classes of critical deviations applying a leap strategy to shift the concerned client order to a last position of the PPS; or
L) in case of delayed components, applying a step strategy to shift the client order to the position of the PPS that accommodates an expected or
confirmed delivery delay, or applying a hop strategy for re-sequencing the concerned client product order to a position of the PPS that is determined based on the order delivery time to the customer; and in case of defective components, applying the step strategy to shift the client order to next position in the initial production sequence having a same set of components thereby annexing the components from a later production order or applying the hop strategy for re-sequencing the concerned client product order to a position in the PPS that is determined based on the order delivery time to the customer and where one of the later client production orders has the same set of components;

applying a dynamic strategy, deciding based on a due date which strategy is employed: IF Current Time+Leap Completion.Time>Order Due Date THEN use step strategy ELSE use leap strategy; and in the case of the absence of the critical deviation, producing the product according to the scheduled production sequence, and in the case of the occurrence of the critical deviation, producing the product according to the re-sequenced production sequence.

6. A method for producing a product in a manufacturing environment according to an individualized client order, the product including a plurality of client specific components that must be supplied by at least one supplier, the method comprising:

a) at engineering level, determining a production sequence for the product, thereby defining milestones in the production sequence for a supply of the client specific components;

b) determining a delivery time for the at least one supplier, thereby defining a time period which the at least one supplier requires for the production of the client specific component;

c) defining a frozen period for the production sequence, the frozen period representing a longest allowable delivery time allotted the at least one supplier;

d) dividing the frozen period into a plurality of sub-sequences aligned with variations of the delivery time for the components of the at least one supplier;

e) at production level during an execution of the production sequence, distinguishing the sub-sequences into either a totally permutable sub-sequence TPS or a partially permutable sub-sequence PPS;

f) monitoring a supply process of the client specific components in view of the milestones and determining whether a critical deviation in the supply process occurs;

g) in case of an absence of the critical deviation, producing the product according to the scheduled production sequence; and h) in case of an occurrence of the critical deviation, executing the following steps in order to re-sequence an initial production sequence to generate a re-sequenced production sequence:

i) determining which client orders are concerned and which sub-sequences are concerned;

j) classifying the critical deviation as having been caused by a delayed supply of the component or by a supply of a defective component; and k) for both classes of critical deviations applying a leap strategy to shift the concerned client order to a last position of the PPS; or l) in case of delayed components, applying a step strategy to shift the client order to the position of the PPS that accommodates an expected or confirmed delivery delay, or applying a hop strategy for re-sequencing the concerned client product order to a position of the PPS that is determined based on the order delivery time to the customer; and in case of defective components, applying the step strategy to shift the client order to next position in the initial production sequence having a same set of components thereby annexing the components from a later production order or applying the Hop strategy for re-sequencing the concerned client product order to a position in the PPS that is determined based on the order delivery time to the customer and where one of the later client production orders has the same set of components;

in the hop strategy distinguishing between the delayed supply of the component and the supply of a defective component;

in case of the supply of a defective component shifting the respectively concerned production order beyond a next production order having an identical set of components and further forward in the production sequence on the basis of a predetermined criterion and, when a new position is eventually found, transferring the components of the subsequent production order with the same set of components to the previously shifted respectively concerned production order; and in case of the delayed supply of the component, proceeding with a jump along the partially permutable sub-sequences according to a predetermined criterion instead of amending all sequenced production orders having an identical set of components; and in the case of the absence of the critical deviation, producing the product according to the scheduled production sequence, and in the case of the occurrence of the critical deviation, producing the product according to the re-sequenced production sequence.

\* \* \* \* \*